United States Patent
Ben-Haim et al.

(10) Patent No.: US 10,686,661 B2
(45) Date of Patent: Jun. 16, 2020

(54) NETWORK PROFILE SYSTEM AND METHOD

(71) Applicant: Intel IP Corporation, Santa Clara, CA (US)

(72) Inventors: Shani Ben-Haim, Haifa (IL); Izoslav Tchigevsky, Portland, OR (US); Michael Glik, Kfar Saba (IL); Solomon Trainin, Haifa (IL)

(73) Assignee: Apple Inc., Cupertino, CA (US)

( * ) Notice: Subject to any disclaimer, the term of this patent is extended or adjusted under 35 U.S.C. 154(b) by 416 days.

(21) Appl. No.: 15/393,551

(22) Filed: Dec. 29, 2016

(65) Prior Publication Data

US 2018/0191572 A1  Jul. 5, 2018

(51) Int. Cl.
*H04W 48/20* (2009.01)
*H04L 12/24* (2006.01)
*H04W 76/11* (2018.01)
*H04W 24/02* (2009.01)
*H04W 84/12* (2009.01)

(52) U.S. Cl.
CPC ...... *H04L 41/0893* (2013.01); *H04L 41/0853* (2013.01); *H04W 48/20* (2013.01); *H04W 76/11* (2018.02); *H04W 24/02* (2013.01); *H04W 84/12* (2013.01)

(58) Field of Classification Search
CPC .... H04L 41/0893; H04L 41/22; H04W 76/11; H04W 48/20; H04W 24/02; H04W 84/12
See application file for complete search history.

(56) References Cited

U.S. PATENT DOCUMENTS

| | | | | |
|---|---|---|---|---|
| 9,814,085 | B2 * | 11/2017 | Cherian | H04W 76/10 |
| 2004/0053617 | A1 * | 3/2004 | Tervo | H04L 29/06 455/445 |
| 2009/0129338 | A1 * | 5/2009 | Horn | H04W 48/02 370/331 |
| 2016/0192292 | A1 * | 6/2016 | Hoglund | H04W 52/0216 370/311 |
| 2017/0094515 | A1 * | 3/2017 | Salo | H04W 12/06 |
| 2017/0135138 | A1 * | 5/2017 | Zhou | H04W 76/10 |
| 2017/0223616 | A1 * | 8/2017 | Hwang | H04W 48/14 |
| 2018/0076877 | A1 * | 3/2018 | Liu | H04B 7/15507 |
| 2018/0227811 | A1 * | 8/2018 | Nagasaka | H04W 28/08 |
| 2018/0227812 | A1 * | 8/2018 | Nagasaka | H04W 88/06 |
| 2018/0263012 | A1 * | 9/2018 | Ryu | H04W 68/02 |
| 2018/0270673 | A1 * | 9/2018 | Chen | H04W 8/005 |
| 2019/0394835 | A1 * | 12/2019 | Mandiganal | G08B 25/10 |

* cited by examiner

*Primary Examiner* — Kodzovi Acolatse

(74) *Attorney, Agent, or Firm* — Eschweiler & Potashnik, LLC

(57) ABSTRACT

A network profile grouping method for a communication device is described. In a network profile grouping method, wireless characteristics of a plurality of wireless access points (APs) are determined. Two or more APs of the plurality of APs are matched together based on the determined wireless characteristics. A group profile identification (ID) is assigned to the matched two or more APs to group the matched two or more APs together.

20 Claims, 9 Drawing Sheets

NETWORK PROFILE SYSTEM AND METHOD

BACKGROUND

Field

Exemplarily implementations described herein generally relate to network management systems and methods, including network profile management and access point selection procedures for communication devices.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

DETAILED DESCRIPTION

Figure 1:
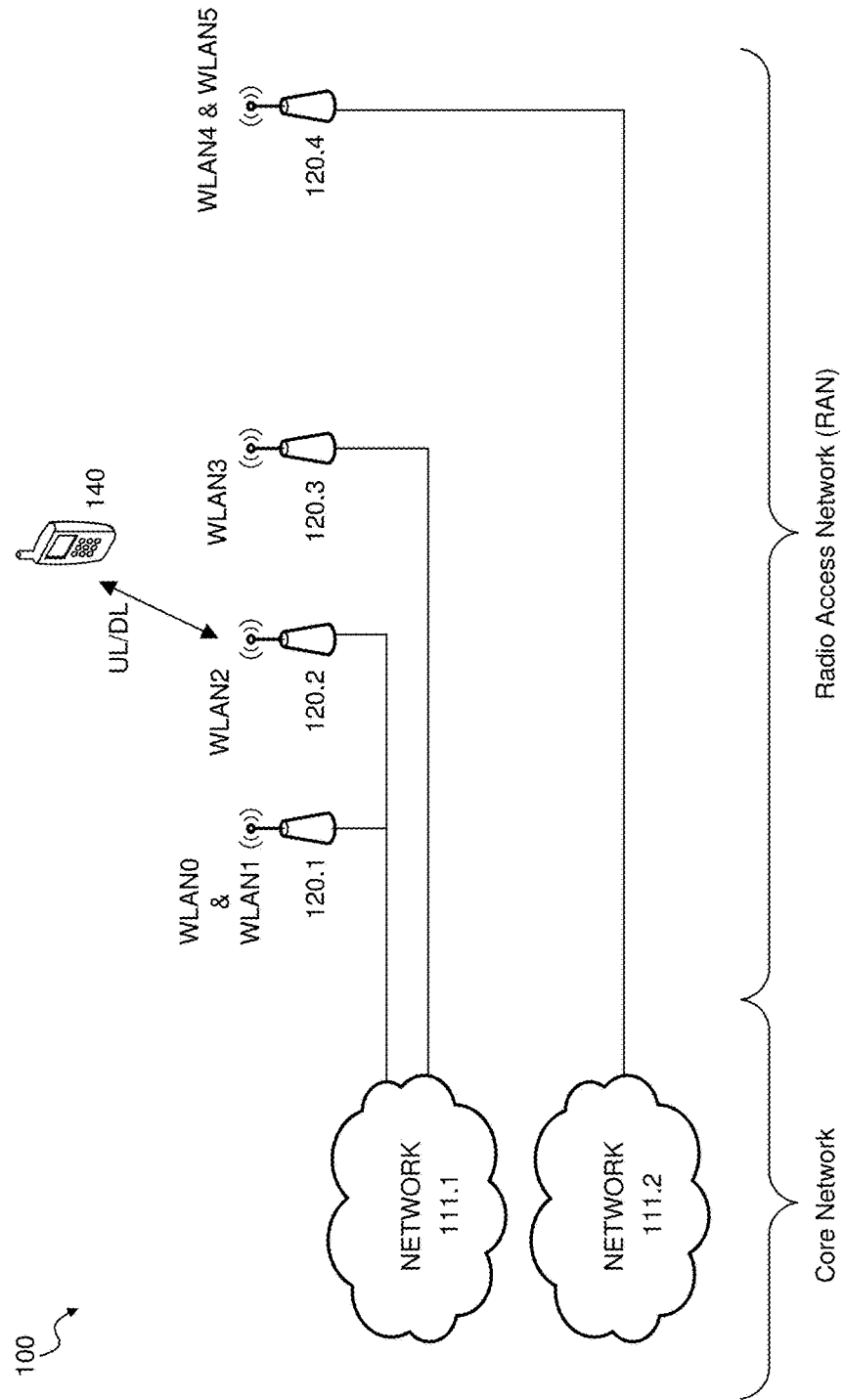
FIG. 1 illustrate an example network environment.

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

As an overview, wireless communication networks, such as wireless local area networks (WLANs) can be deployed in various environments, including, for example, home/personal networks, enterprise office networks, Small or home office (SOHO) networks, and/or public networks— including municipal networks; networks at shopping centers, restaurants, public buildings, schools, libraries or other municipal building, sport venues, etc. These deployments may include several access points (APs) within the same vicinity, and may include various configurations, including Band (e.g., 2.4 GHz, 5.2 GHz, 60 GHz); Frequency (Channel); Service Set Identifier SSID; Security (Encryption (e.g., Temporal Key Integrity Protocol (TKIP) and/or Advanced Encryption Standard (AES)) and/or Authentication (e.g., Wi-Fi Protected Access (WPA/WPA2) and/or Wired Equivalent Privacy (WEP)).

WLAN deployments can utilize one or more wireless communication protocols, such as one or more Institute of Electrical and Electronics Engineers (IEEE) 802.11 protocol. The IEEE 802.11 protocols can include, for example (but are not limited to), IEEE 802.11g, IEEE 802.11n, IEEE 802.11ac, and/or one or more Wireless Gigabit Alliance (WiGig) protocols such as IEEE 802.11ad and IEEE 802.11ay, which can operate on the 60 GHz band.

Although exemplary aspects are described with references to one or more IEEE 802.11 protocols, the present disclosure is not limited thereto. Additionally or alternatively, the aspects can be applied to one or more other communication protocols, including one or more cellular communication protocols (e.g., Long Term Evolution (LTE), one or more 5G communication protocols), one or more Bluetooth protocols, one or more other non-cellar protocols, and/or one or more other protocols as would be understood by one of ordinary skill in the relevant arts.

AP selection configurations and connection logic can include, for example:

1. AP Selection (e.g., from a disconnected mode): the communication device is configured to search for an available AP and connect to a discovered AP based a matching network profile. The AP selection can be an automatic selection. The communication device can be configured to compare the configurations (e.g., parameters/characteristic) of the AP(s) to one or more AP profiles in a profile list, one or more AP profiles in a list of past connected APs, a profile of a most recently connected one or more APs, a highest ranking AP within a profile list, etc.

2. Roaming trigger (e.g., from a connected mode): search for an available AP having a profile matching the profile (e.g., having a matching SSID & Security configuration) of the currently connected AP. If no matching AP is discovered, the communication device can be configured to remain connected with the current AP until a disconnection point (e.g., becomes out of range of the AP). At this point, the communication device can then perform the AP selection operation above.

In an exemplary aspect, the communication device can include a network connection management system that is configured to control the network management of the communication device, including one or more AP selections and/or one or more roaming trigger operations.

In exemplary aspects, APs may have different extended service sets (ESS) (e.g., different SSIDs and/or Security configurations) from one another, but may be connected to a same network backbone and/or provide the same service(s). For example, two APs having different SSIDs may nonetheless provide the same service (e.g., internet/intranet services) or be on the same network backbone. In this example, a communication device moving from the first AP to the second AP so as to trigger a roaming operation, the communication device will not roam to the second AP to maintain a continuous connection. Rather, the communication device will disconnect from the first AP, then establish a connection with the second AP even though the second AP is configured to provide the same services as the first AP. For example, if the first AP has an SSID of "HomeNetwork" and the second AP has an SSID of "HomeNetwork1," but the first and second APs are nonetheless supported by the same network backbone (e.g., in the same office, same home, etc.), the communication device will not seamlessly roam between the APs. That is, the communication device will disconnect from the currently serving AP before connecting to the other AP because the APs appear as different networks to the communication device.

In exemplary aspects of the present disclosure, the communication device, one or more APs, and/or one or more core network providers can be configured to group two or more APs and/or wireless networks in a corresponding profile group by assigning two or more network profiles (e.g., SSIDs) to common profile identification (ID). That is, exemplary aspects can be implemented at a client level (e.g., via the communication device), at the AP level, and/or at the service level (e.g., via the service provider).

The communication device, AP(s), and/or service provider can be configured to perform and/or control one or more AP selection operations and/or one or more roaming trigger operations based one or more of the profile groups. Using the profile grouping: different networks connected to the same backbone and/or provide the same service (e.g., as commonly found in enterprise networks); different networks with potentially different backbones, but provide the same service (e.g. as commonly in public networks); and/or different access points with different network configurations (e.g., SOHO or consumer networks), can be treated as a single AP group.

In an exemplary aspect, the communication device, one or more APs, and/or one or more core network providers can be configured to create an intra-ESS network composed of grouped (also referred to as linked) networks or services that function similar to or exactly as a single ESS configuration. The intra-ESS networks allow for the communication device, AP(s), and/or service provider to increase the efficiency of network transitions and/or reduce or eliminate disconnections and loss of communications between such transitions, as well as increasing link qualities between the communication device and serving APs and improving the user experiences for a user of the communication device.

FIG. 1 illustrates an example communication environment 100, respectively, that includes a radio access network (RAN) and a core network. The RAN includes one or more access points (APs) 120 that are configured to wireless communicate with one or more communication devices 140. The APs 120 can each support one or WLAN networks. Although FIG. 1 illustrates that the various APs 120 support different WLAN networks, two or more APs can support on or more of the same WLAN networks in one or more of the exemplary aspects.

As illustrated in FIG. 1, the RAN includes APs 120.1, 120.2, 120.3, and 120.4 which are communicatively coupled to the network 111. Further, two or more APs (e.g., 120.1 and 120.2 can be communicatively coupled together (e.g., such as in an enterprise deployment). The number of APs 120, mobile devices 140, and/or networks 111 are not limited to the exemplary quantities illustrated in FIG. 1, and the communication environment 100 can include any number of the various components as would be understood by one of ordinary skill in the relevant art(s).

The core network includes one or more backhaul communication networks 111. In an exemplary aspect, the backhaul communication network 111 can include one or more well-known communication components—such as one or more network switches, one or more network gateways, and/or one or more servers. The backhaul communication network 111 can include one or more devices and/or components configured to exchange data with one or more other devices and/or components via one or more wired and/or wireless communications protocols. Although FIG. 1 shows the APs 120.1, 120.2, and 120.3 are supported by network 111.1 while AP 120.4 is supported by core network 111.2, the APs 120 can be supported by the same network 111 in one or more aspects.

In an exemplary aspect, the networks 111 can be configured to group two or more APs in a corresponding profile group and/or be configured to perform and/or control one or more AP selection operations and/or one or more roaming trigger operations based one or more of the profile groups. In an exemplary aspect, the grouping of APs into a corresponding profile group is based on, for example, whether: the APs share a common backbone network serving the APs, the APs provide one or more common services, and/or the APs are associated with a common entity (e.g., home, office, shopping center, airport, municipality, etc.) but have different network configurations (e.g., different SSIDs, security details, etc.).

In these example, by using the profile grouping: different networks connected to the same backbone and/or provide the same service (e.g., as commonly found in enterprise networks); different networks with potentially different backbones, but provide the same service (e.g. as commonly in public networks); and/or different access points with different network configurations (e.g., SOHO or consumer networks), can collectively be treated as an AP group made up multiple APs. The communication device(s) can then use these group profiles to select and connect to an AP out of a group of APs even though the various APs of the particular group may have different network configurations.

In an exemplary aspect, core network(s) 111 can be configured to create an intra-ESS network composed of grouped (also referred to as linked) networks or services that function similar to or exactly as a single ESS configuration. The intra-ESS networks allow for the communication device, AP(s), and/or service provider to increase the efficiency of network transitions and/or reduce or eliminate disconnections and loss of communications between such transitions, as well as increasing link qualities between the communication device(s) and serving APs, and improving the user experience for a user of the communication device.

In an exemplary aspect, the network(s) 111 include processor circuitry configured to perform one or more functions and/or operations of the network(s) 111, including (but not limited to), for example, grouping APs in corresponding profile groups, creating intra-ESS networks, performing one or more AP selection operations and/or one or more roaming trigger operations, controlling one or more components of the network(s) 111 to perform one or more AP selection operations and/or one or more roaming trigger operations, and/or controlling the AP(s) 120 and/or communication device(s) 140 to perform one or more AP selection operations and/or one or more roaming trigger operations.

The networks 111 can include storage devices, such as memory that can store and/or be configured to store one or more network profiles (e.g., ESS information), one or more network profile groups, network security information, network management information such as one or more AP selection configurations and/or one or more roaming trigger operation configurations, one or more network profile lists, one or more network profile group lists of networks and corresponding group identification information (e.g., group IDs), and/or other information as would be understood by one of ordinary skill in the relevant art.

In exemplary aspects, the APs 120 communicate with one or more service providers and/or one or more other APs 120 via one or more backhaul communication networks 111. In an exemplary aspect, the backhaul communication network(s) 111 are internet protocol (IP) backhaul networks. The backhaul communication networks 111 can include one or more elements of an evolved packet core, including, for example, one or more Mobility Management Entities (MME), serving gateways (S-GW), public data network (PDN) gateways (P-GW), Home Subscriber Servers (HSS), Access Network Discovery and Selection Functions (ANDSF), Evolved Packet Data Gateways (ePDG), and/or one or more other core network components as would be understood by one of ordinary skill in the relevant arts.

The communication device 140 and/or AP 120 can include one or more transceivers configured to transmit and/or receive wireless communications via one or more wireless technologies within the communication environment 100. The communication device 140 can be configured to communicate with the APs 120, where the communication device 140 receives signals on one or more downlink (DL) channels from the AP 120, and transmits signals to the AP 120 on one or more respective uplink (UL) channels. In an exemplary aspect, the AP 120 and/or communication device 140 each include processor circuitry that is configured to communicate via one or more wireless technologies. The communication device 140 can be further configured to support co-existing wireless communications with the AP 120.

In an exemplary aspect, the APs 120 can support wireless communications conforming to one or more communication protocols. In an exemplary aspect, the supports one or more IEEE 802.11 protocols. Those skilled in the relevant art(s) will understand that the AP 120 is not limited to IEEE 802.11 communications, and can be configured for communications that conform to one or more other protocols (e.g. LTE, Bluetooth) in addition to or alternatively to the IEEE 802.11 protocols. In aspects where the AP 120 supports one or more cellular communication protocols (e.g., LTE), the AP 120 can also be referred to as a base station (or eNodeB, eNB).

Examples of the communication device 140 include (but are not limited to) a mobile computing device—such as a laptop computer, a tablet computer, a mobile telephone or smartphone, a "phablet," a personal digital assistant (PDA), and mobile media player; and a wearable computing device—such as a computerized wrist watch or "smart" watch, and computerized eyeglasses. In some aspects of the present disclosure, the communication device 140 may be a stationary device, including, for example, a stationary computing device—such as a personal computer (PC), a desktop computer, a computerized kiosk, and an automotive/aeronautical/maritime in-dash computer terminal.

Figure 2A:
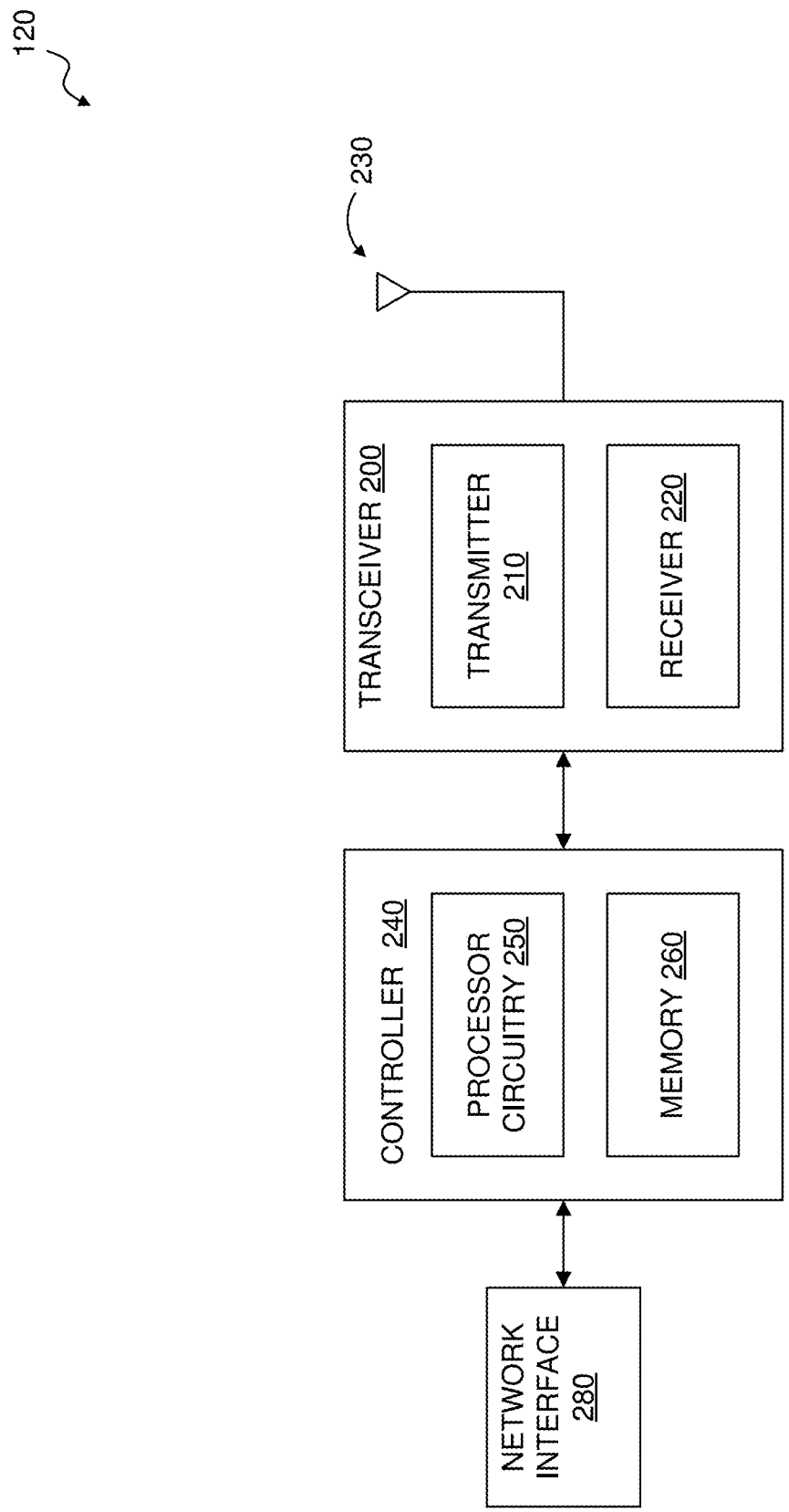
FIG. 2A illustrates an access point according to an exemplary aspect of the present disclosure.

FIG. 2A illustrates an exemplary aspect of the AP 120. For example, the AP 120 can include a transceiver 200 and a network interface 280, each communicatively coupled to controller 240.

The transceiver 200 includes processor circuitry that is configured to transmit and/or receive wireless communications via one or more wireless technologies within the communication environment 100. For example, the transceiver 200 can include one or more transmitters 210 and one or more receivers 220 that configured to transmit and receive wireless communications, respectively, via one or more antennas 230. Those skilled in the relevant art(s) will recognize that the transceiver 200 can also include (but is not limited to) a digital signal processor (DSP), modulator and/or demodulator, a digital-to-analog converter (DAC) and/or an analog-to-digital converter (ADC), an encoder/decoder (e.g., encoders/decoders having convolution, tail-biting convolution, turbo, Viterbi, and/or Low Density Parity Check (LDPC) encoder/decoder functionality), a frequency converter (including mixers, local oscillators, and filters), Fast-Fourier Transform (FFT), precoder, and/or constellation mapper/de-mapper that can be utilized in transmitting and/or receiving of wireless communications. Further, those skilled in the relevant art(s) will recognize that the antenna 230 may include an integer array of antennas, and that the antenna 230 may be capable of both transmitting and receiving wireless communication signals.

In an exemplary aspect, transceiver 200 supports one or more IEEE 802.11 protocols. One of ordinary skill in the relevant arts will understand that the transceiver 200 is not limited to IEEE 802.11 communications, and can be configured for communications that conform to one or more other cellular and non-cellular protocols in addition to or alternatively to the IEEE 802.11 protocols.

The network interface 280 includes processor circuitry that is configured to transmit and/or receive communications via one or more wired technologies to/from the backhaul communication network(s) 111. Those skilled in the relevant art(s) will recognize that the network interface 280 can also include (but is not limited to) a digital signal processor (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will understand that the network interface 280 is not limited to wired communication technologies and can be configured for communications that conform to one or more well-known wireless technologies in addition to, or alternatively to, one or more well-known wired technologies.

The controller 240 can include processor circuitry 250 that is configured to carry out instructions to perform arithmetical, logical, and/or input/output (I/O) operations of the AP 120, and/or of one or more components of the AP 120. The processor circuitry 250 can be configured control the operation of the transceiver 200—including, for example, transmitting and/or receiving of wireless communications via the transceiver 200, and/or perform one or more baseband processing functions (e.g., media access control (MAC), encoding/decoding, modulation/demodulation, data symbol mapping, error correction, etc.). In an exemplary aspect, the controller 240 can include one or more elements of a protocol stack such as, for example, elements of an evolved universal terrestrial radio access network (EUTRAN) protocol—including, for example, physical (PHY) layer, media access control (MAC), radio link control (RLC), packet data convergence protocol (PDCP), and/or radio resource control (RRC) elements. The Non Access Stratum (NAS) is the protocol between the mobile device (UE) and the Mobility Management Entity (MME) and can be configured for authentication operations, security control and/or the generation of paging messages.

In an exemplary aspect, the controller 240 can be configured to group two or more APs and/or networks in a corresponding profile group and/or be configured to perform and/or control one or more AP selection operations and/or one or more roaming trigger operations based one or more of the profile groups. In an exemplary aspect, the grouping of APs into a corresponding profile group is based on, for example, whether: the APs share a common backbone network serving the APs, the APs provide one or more common services, and/or the APs are associated with a common entity (e.g., home, office, shopping center, airport, municipality, etc.) but have different network configurations (e.g., different SSIDs, security details, etc.).

In these example, by using the profile grouping: different networks connected to the same backbone and/or provide the same service (e.g., as commonly found in enterprise networks); different networks with potentially different backbones, but provide the same service (e.g. as commonly in public networks); and/or different access points with different network configurations (e.g., SOHO or consumer networks), can collectively be treated as an AP group made up multiple APs. The communication device(s) can then use these group profiles to select and connect to an AP out of a group of APs even though the various APs of the particular group may have different network configurations.

In an exemplary aspect, the controller 240 can be configured to create an intra-ESS network composed of grouped (also referred to as linked) networks or services that function similar to or exactly as a single ESS configuration. The intra-ESS networks allow for the communication device, AP(s), and/or service provider to increase the efficiency of network transitions and/or reduce or eliminate disconnections and loss of communications between such transitions, as well as increasing link qualities between the communication device(s) and serving APs, and improving the user experience for a user of the communication device.

In an exemplary aspect, the processor circuitry 250 is configured to perform one or more functions and/or operations of the AP 120 (and/or of the controller 240), including (but not limited to), for example, grouping APs in corresponding profile groups, creating intra-ESS networks, performing one or more AP selection operations and/or one or more roaming trigger operations, controlling one or more components of the AP 120 (and/or the controller 240) to perform one or more AP selection operations and/or one or more roaming trigger operations, and/or controlling the network(s) 111 and/or communication device(s) 140 to perform one or more AP selection operations and/or one or more roaming trigger operations.

The controller 240 can further include a memory 260 that stores data and/or instructions, where when the instructions are executed by the processor circuitry 250, controls the processor circuitry 250 to perform the functions described herein. The memory 260 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 260 can be non-removable, removable, or a combination of both. In an exemplary aspect, the memory 260 can store and/or be configured to store one or more network profiles (e.g., ESS information), one or more network profile groups, network security information, network management information such as one or more AP selection configurations and/or one or more roaming trigger operation configurations, one or more network profile lists, one or more network profile group lists of networks and corresponding group identification information (e.g., group IDs), and/or other information as would be understood by one of ordinary skill in the relevant art.

Figure 2B:
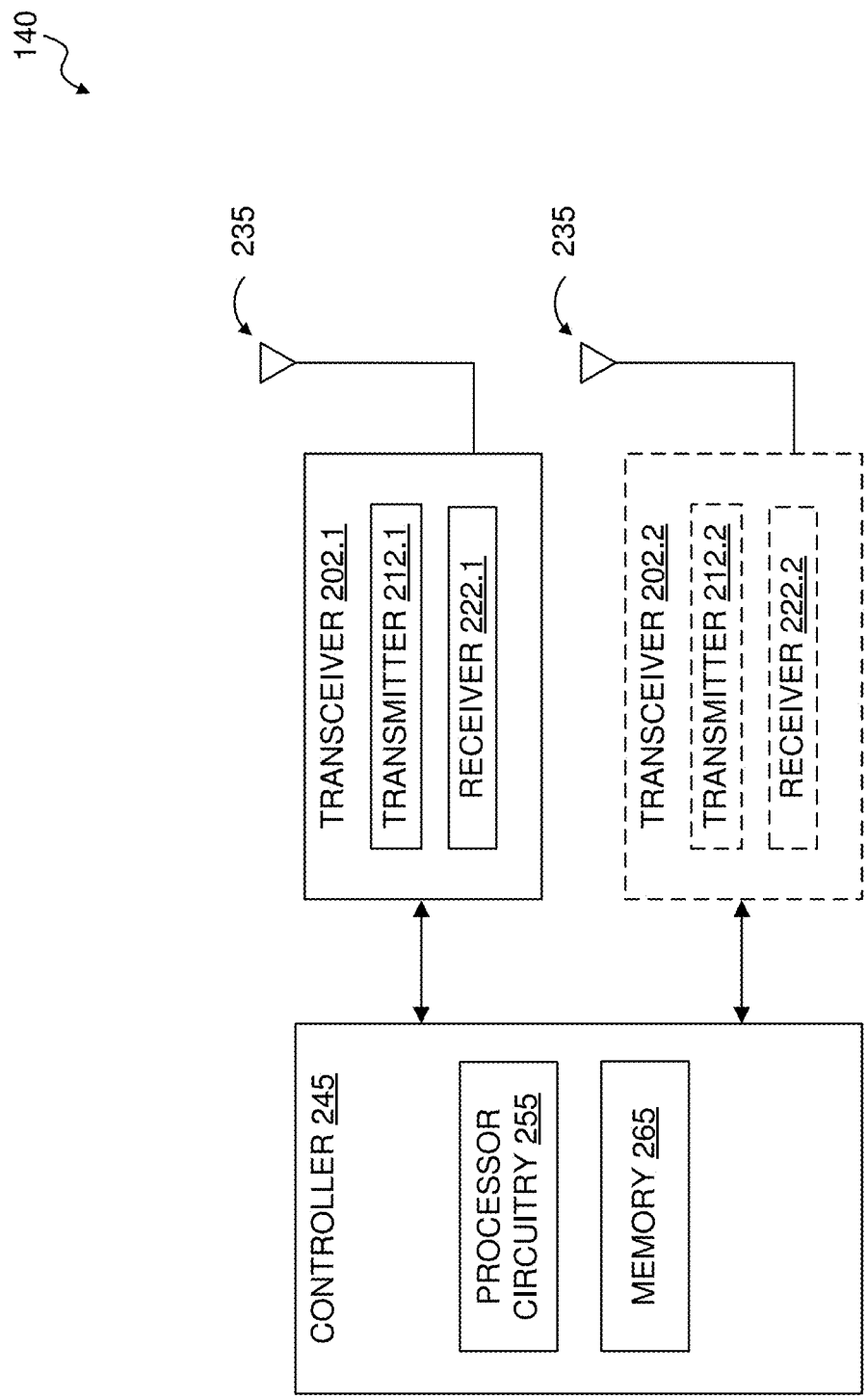
FIG. 2B illustrates a communication device according to an exemplary aspect of the present disclosure.

FIG. 2B illustrates the communication device 140 according to an exemplary aspect of the present disclosure. The communication device 140 can include controller 245 communicatively coupled to one or more transceivers 202 configured to transmit and/or receive wireless communications via one or more wireless technologies within the communication environment 100.

The transceiver 202 can include processor circuitry that is configured for transmitting and/or receiving wireless communications conforming to one or more wireless protocols. For example, the transceiver 202 can include a transmitter 212 and a receiver 222 configured for transmitting and receiving wireless communications via one or more antennas 235. In an exemplary aspect, the transceiver 202 and/or controller 345 includes a WLAN modem configured for WLAN communications. In one aspect, the WLAN modem is composed of multiple components with a portion of the components being implemented in the controller 245 and another portion of the components being implemented in the transceiver(s) 202.

In exemplary aspects, the transceiver 202 can include (but is not limited to) a digital signal processer (DSP), modulator and/or demodulator, a digital-to-analog converter (DAC) and/or an analog-to-digital converter (ADC), an encoder/decoder (e.g., encoders/decoders having convolution, tail-biting convolution, turbo, Viterbi, and/or Low Density Parity Check (LDPC) encoder/decoder functionality), a frequency converter (including mixers, local oscillators, and filters), Fast-Fourier Transform (FFT), precoder, and/or constellation mapper/de-mapper that can be utilized in transmitting and/or receiving of wireless communications. Further, those skilled in the relevant art(s) will recognize that antenna 235 may include an integer array of antennas, and that the antennas may be capable of both transmitting and receiving wireless communication signals.

The controller 245 can include processor circuity 255 that is configured to control the overall operation of the communication device 140, such as the operation of the transceiver(s) 202—including, for example, transmitting and/or receiving of wireless communications via the transceiver 202, and/or perform one or more baseband processing functions (e.g., media access control (MAC), encoding/decoding, modulation/demodulation, data symbol mapping, error correction, etc.); the running of one or more applications and/or operating systems; power management (e.g., battery control and monitoring); display settings; volume control; and/or user interactions via one or more user interfaces (e.g., keyboard, touchscreen display, microphone, speaker, etc.). In an exemplary aspect, the controller 245 can include one or more elements of a protocol stack such as, a physical (PHY) layer, media access control (MAC), radio link control (RLC), packet data convergence protocol (PDCP), and/or radio resource control (RRC) elements. The Non Access Stratum (NAS) is the protocol between the mobile device (UE) and the Mobility Management Entity (MME) and can be configured for authentication operations, security control and/or the generation of paging messages.

The controller 245 can further include a memory 265 that stores data and/or instructions, where when the instructions are executed by the processor circuitry 255, controls the processor circuitry 255 to perform the functions described herein. The memory 265 can be any well-known volatile and/or non-volatile memory, and can be non-removable, removable, or a combination of both. In an exemplary aspect, the memory 265 can store and/or be configured to store one or more network profiles (e.g., ESS information), one or more network profile groups, network security information, network management information such as one or more AP selection configurations and/or one or more roaming trigger operation configurations, one or more network profile lists, one or more network profile group lists of networks and corresponding group identification information (e.g., group IDs), and/or other information as would be understood by one of ordinary skill in the relevant art. For example, the memory 265 can store such information in aspects where the communication device 140 is configured to group two or more APs in a corresponding profile group and/or perform one or more network connection management operations, such as one or more AP selections and/or one or more roaming trigger operations.

In an exemplary aspect, the controller 245 is configured to group two or more APs and/or two or more networks in a corresponding profile group and/or be configured to perform and/or control one or more AP selection operations and/or one or more roaming trigger operations based one or more of the profile groups. In an exemplary aspect, the grouping of APs and/or networks into a corresponding profile group is based on, for example, whether: the APs share a common backbone network serving the APs, the APs provide one or more common services, and/or the APs are associated with a common entity (e.g., home, office, shopping center, airport, municipality, etc.) but have different network configurations (e.g., different SSIDs, security details, etc.). In an exemplary aspect, when grouping two or more networks (e.g., using a profile ID), the networks can be supported by the same AP, by different APs, or a combination of multiple APs where one or more of the multiple APs include two or more networks being grouped to together with one or more networks from one or more different APs.

In these example, by using the profile grouping: different networks connected to the same backbone and/or provide the same service (e.g., as commonly found in enterprise networks); different networks with potentially different backbones, but provide the same service (e.g. as commonly in public networks); and/or different access points with different network configurations (e.g., SOHO or consumer networks), can collectively be treated as an AP group made up multiple APs. The communication device(s) can then use these group profiles to select and connect to an AP out of a group of APs even though the various APs of the particular group may have different network configurations.

In an exemplary aspect, the controller 245 can be configured to create an intra-ESS network composed of grouped (also referred to as linked) networks or services that function similar to or exactly as a single ESS configuration. The intra-ESS networks allow for the communication device, AP(s), and/or service provider to increase the efficiency of network transitions and/or reduce or eliminate disconnections and loss of communications between such transitions, as well as increasing link qualities between the communication device(s) and serving APs, and improving the user experience for a user of the communication device.

In an exemplary aspect, the processor circuitry 255 is configured to perform one or more functions and/or operations of the communication device 140 (and/or of the controller 245), including (but not limited to), for example, grouping APs in corresponding profile groups, creating intra-ESS networks, performing one or more AP selection operations and/or one or more roaming trigger operations, controlling one or more components of the communication device 140 (and/or the controller 245) to perform one or more AP selection operations and/or one or more roaming trigger operations, and/or controlling the network(s) 111 and/or APs 120 to perform one or more AP selection operations and/or one or more roaming trigger operations.

Using the grouped network profiles, the communication device 140 can be configured to perform AP selection operations and/or roaming operations as provided below.

1. AP Selection (e.g., from a disconnected mode): the communication device 140 is configured to search for an available AP and connect to a discovered AP based a matching network profile ID. For example, the communication device can be configured to search for a network from a plurality of networks grouped together based their common profile ID value. The communication device prioritize/rank the APs/networks within a profile ID group based on current link quality, signal strength (e.g., RSSI (Received Signal Strength Indicator)), signal-to-noise ratio (SNR), signal-to-interference-plus-noise ratio (SINR), transmission power, and/or one or more other signal characteristics as would be understood by one of ordinary skill in the art.

2. Roaming trigger (e.g., from a connected mode): Instead of searching for an available AP having a profile matching the profile (e.g., having a matching SSID & Security configuration) of the currently connected AP, the communication device 140 can be configured to search for an available AP based a matching network profile ID. For example, the communication device 140 can be configured to search for a network having a matching profile ID. This operation can be used to increase the efficiency of network transitions and/or reduce or eliminate disconnections and loss of communications during the transition to a new network and/or AP. That is, the new network/AP is connected to before disconnecting from the current network AP so as to provide a smooth and continuously established connection.

In an exemplary aspect, by grouping APs and/or different networks/SSIDs based on profile IDs, different networks connected to a common backbone network and/or provide a same service (e.g., enterprise environments) can be treated as a group; networks with different backbones (or common backbones but provide a same service (e.g., public environments) can be treated as a group, and/or APs and/or networks having difference network configurations (e.g., different SSIDs and/or security) can be treated as a group (e.g., small office/home office and/or consumer environments) can be treated as a group.

In an exemplary aspect, intra-ESS network can be created that are composed of grouped (also referred to as linked) networks or services that function similar to or exactly as a single ESS configuration. The intra-ESS networks allow for the communication device 140, AP(s) 120, and/or service provider (network 111) to increase the efficiency of network transitions and/or reduce or eliminate disconnections and loss of communications between such transitions, as well as increasing link qualities between the communication device and serving APs and improving the user experiences for a user of the communication device.

In an exemplary aspect, to create and/or maintain a wireless communication, the following operations are performed:

1. Configuration—one or more networks are added to a network profile (by selecting a network from a list of available APs discovered via a network scan, or entering connection details);

2. Scanning Trigger—one or more scanning operations are performed (e.g., periodically by an operating system of the device), or during a roaming operation in which the device searches for a candidate to roam to from the current connection (e.g., due to deteriorated link quality); and 3. AP selection—a network profile and AP are chosen (e.g., based on a profile list) for an initial connection or a profile and AP are chosen having a matching SSID & Security configuration during a roaming operation.

In an exemplary aspect, these operations (1-3) are modified to consider that: APs having different profiles (e.g., different SSID, security) can provide the same service level as a current network connection (e.g. internet/intranet). These modifications reduce or avoid a non-ideal AP being selected from available APs. In these examples, AP selection is improved.

Network connection operations, including the operation of the communication device 140, APs, and/or network(s) 111 will be described in detail with reference to FIGS. 3-7 below.

Figure 3:
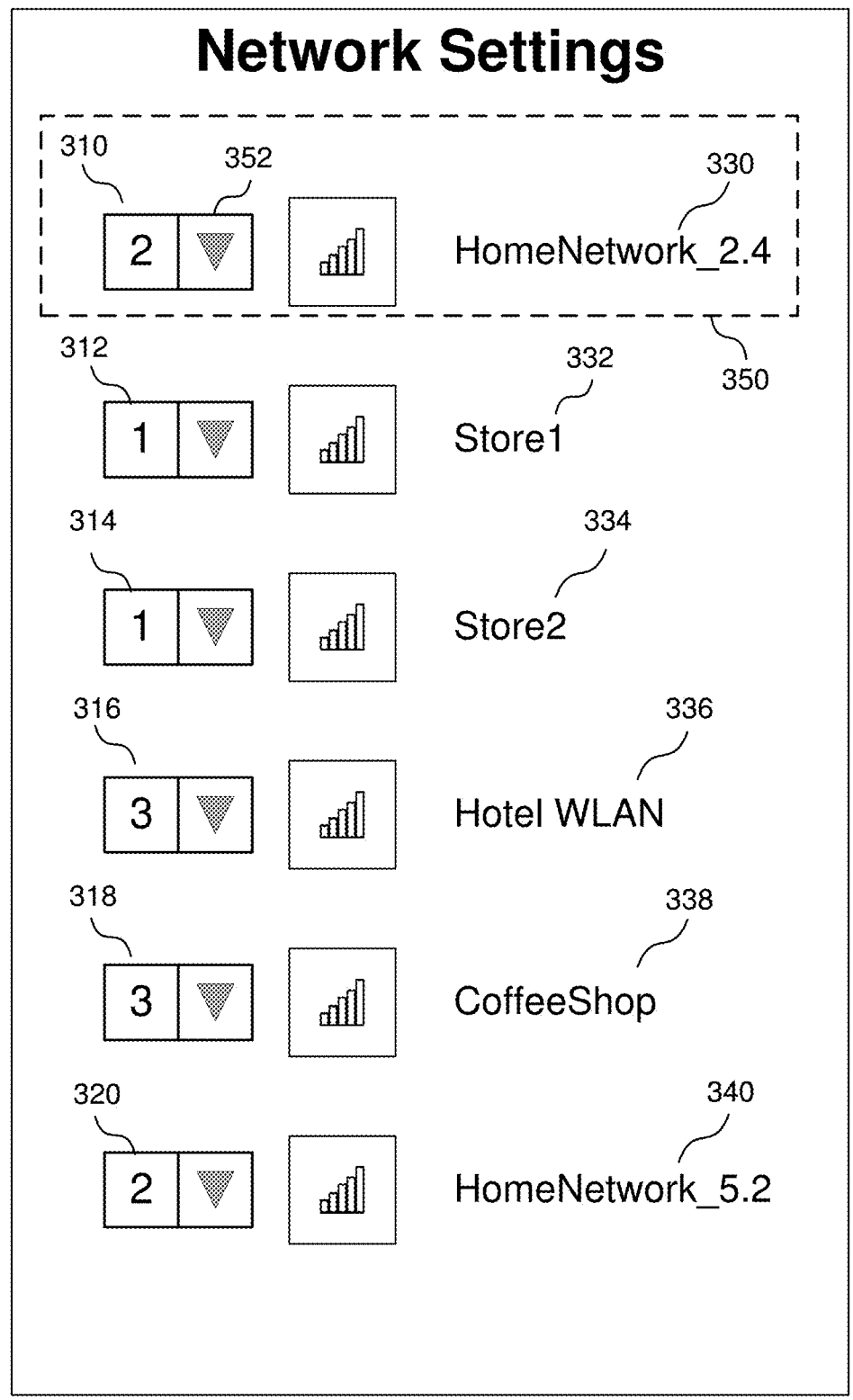
FIG. 3 illustrates a profile configuration interface according to an exemplary aspect of the present disclosure.

FIG. 3 illustrates a profile configuration interface 300 according to an exemplary aspect of the present disclosure. The interface 300 includes one or more network profiles 350, each including a SSID 330, 332, 334, 336, 338, 340 having a corresponding profile identification (ID) 310, 312, 314, 316, 318, 320. The network profiles can include a selector 352 configured to select a profile ID for the corresponding network profile 350. The selector 352 can be, for example, a drop-down menu that lists available profile ID values that can be selected as the profile ID for the network profile 350. The selector 352 can include a list of available profile IDs and be configured to display the available profile IDs when selected. The selector 352 can also be configured to accept entry of a profile ID not included in a list of available profile IDs.

In an exemplary aspect, the interface is graphical user interface (GUI). For example, the interface 300 can be represented as a GUI on a display of the communication device 300, a display of the AP 120, a display of a computing device (e.g., computer) associated with the AP 120 and in communication with the AP 120, a display of the network 111, and/or a display of a computing device (e.g., computer) associated with the network 111 and in communication with the network 111.

The interface 300 can be associated with the communication device 140, AP 120, and/or network 111. The association can be based on the implementation of the communication management system within one or more of the various devices. The communication management system can be configured to perform one or more network profile grouping operations and/or network management operations (e.g., one or more AP selections and/or one or more roaming trigger operations).

Figure 7:
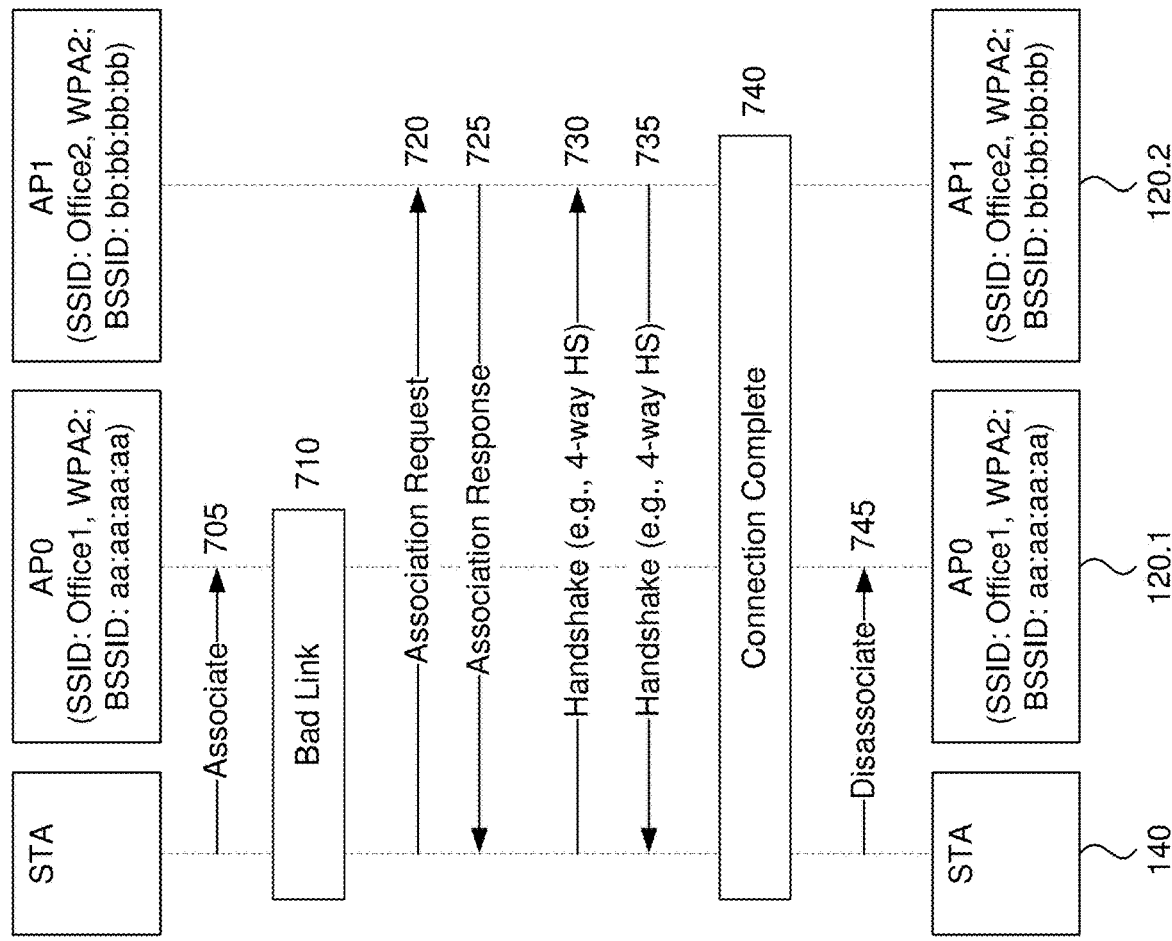
FIG. 7 illustrates an access point selection operation according to an exemplary aspect of the present disclosure.
Figure 8:
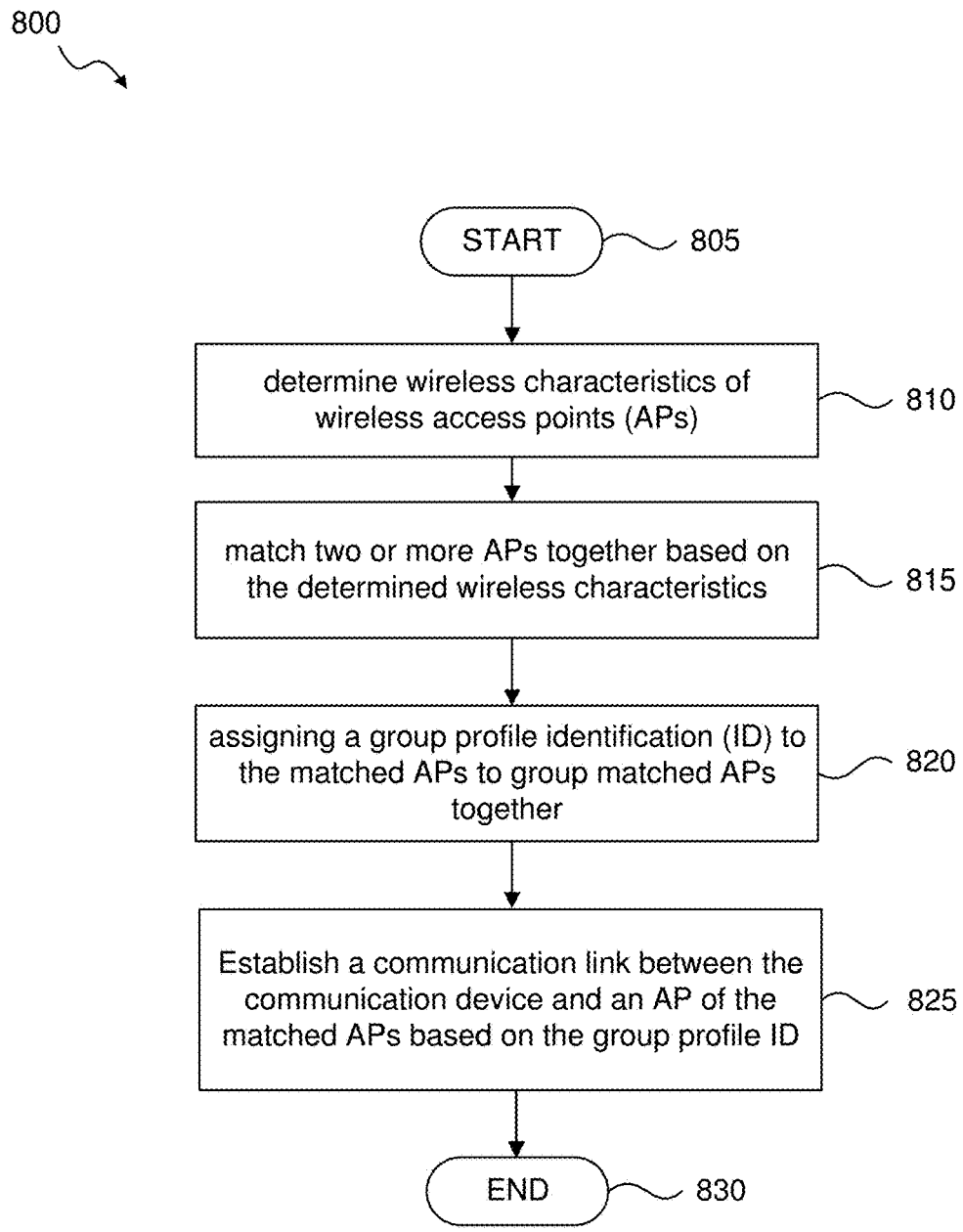
FIG. 8 illustrates a network profile grouping method according to an exemplary aspect of the present disclosure The exemplary aspects of the present disclosure will be described with reference to the accompanying drawings. The drawing in which an element first appears is typically indicated by the leftmost digit(s) in the corresponding reference number.

In an exemplary aspect, with reference to FIG. 8, the communication device 140, AP 120, and/or network 111 are configured to perform a network profile grouping method 800. The flowchart 800 of the method is described with continued reference to FIGS. 1-7. The steps of the method are not limited to the order described below, and the various steps may be performed in a different order. Further, two or more steps of the method may be performed simultaneously with each other.

The method of flowchart 800 begins at step 805 and transitions to operation 810, where wireless characteristics of a plurality of wireless access points (APs) are determined. In an exemplary aspect, the communication device 140 (e.g., controller 245) is configured to determine one or more wireless characteristics of the APs. In other aspects, the AP 120 (e.g., controller 240) and/or network 111 are configured to determine the wireless characteristic(s).

In an exemplary aspect, the wireless characteristics include (but are not limited to), for example, service set identifiers (SSIDs) of the APs, security configuration information of the plurality of APs (Encryption (e.g., Temporal Key Integrity Protocol (TKIP) and/or Advanced Encryption Standard (AES)) and/or Authentication (e.g., Wi-Fi Protected Access (WPA/WPA2) and/or Wired Equivalent Privacy (WEP)); ESS information of the APs, band information of the APs (e.g., 2.4 GHz, 5.2 GHz, 60 GHz); Frequency (Channel) information of the APs; backhaul network information of one or more backhaul networks supporting the APs; service provider information of one or more service providers supporting the APs; and/or one or more other wireless characteristics as would be understood by one of ordinary skill in the relevant arts.

After operation 810, the flowchart 800 transitions to operation 815, where two or more APs are matched together based on the determined wireless characteristics. In an exemplary aspect, the communication device 140 (e.g., controller 245) is configured to match the APs based on the wireless characteristic. In other aspects, the AP 120 (e.g., controller 240) and/or network 111 are configured to match the APs.

After operation 815, the flowchart 800 transitions to operation 820, where a group profile ID 310-320 is assigned to the matched APs to group the APs together by the assigned group profile ID value. For example, as illustrated in FIG. 3, SSID 330 is matched with SSID 340 and assigned the same group profile ID value of "2." In an exemplary aspect, the communication device 140 (e.g., controller 245) is configured to assign the group profile ID value to the matched APs. In other aspects, the AP 120 (e.g., controller 240) and/or network 111 are configured to assign the group profile ID value to the matched APs.

After operation 820, the flowchart 800 transitions to operation 825, where a communication link between the communication device and one or more of the APs that were matched together is established. In an exemplary aspect, the communication device 140 is configured to transition from a first AP of the matched APs to a second AP of the matched APs. For example, using the common group profile ID value, the communication device 140 is aware of the relationship between the matched APs, and can use this knowledge to transition from one AP to the other AP. In an exemplary aspect, the communication device 140 (e.g., controller 245) is configured to establish the communication link and/or transition between APs. In other aspects, the AP 120 (e.g., controller 240) and/or network 111 are configured to establish the communication link and/or transition between APs.

After operation 825, the flowchart 800 transitions to operation 830 where the flowchart 800 ends. The flowchart 800 may be repeated one or more times. For example, if a new AP and/or SSID is detected (e.g., by the communication device 140), the flowchart 800 can be repeated to match the new AP/SSID and assign the new AP/SSID a corresponding group profile ID.

The interface 300 can be configured to facilitate the selection of a SSIDs 330, 332, 334, 336, 338, 340 so as to control the corresponding device (e.g., communication device 140) to initiate a connection with a network corresponding to the selected SSID and/or control the device to disconnect from a current connection by the selection of the current network. The selection of a SSID can also control the interface 300 to provide one or more settings, network parameters, and/or other information of the selected SSID. The interface 300 can also facilitate the creation of one or more network profiles, deletion of one or more network profiles In an exemplary aspect, the interface 300 can be configured to group two or more APs and/or two or more networks in a corresponding network profile group based on a profile ID (e.g., 310, 312, 314, 316, 318, 320).

For example, as illustrated in FIG. 3, SSID 330 and SSID 340 are grouped together in the same network profile group based on the profile IDs 310 and 320 having the same value of "2." In an exemplary aspect, both networks having SSIDs 330 and 340 can be supported by a common AP or can be supported by different APs. For example, SSID 330 "HomeNetwork_2.4" can correspond to the SSID of a 2.4 GHz network from an AP while the SSID 340 "HomeNetwork_5.2" can correspond to the SSID of a 5.2 GHz network from the same AP. As described above, in aspects where the two SSIDs 330 and 340 correspond to networks on different APs, the core network supporting the APs can be the same or different.

In a similar example, SSID 332 and SSID 334 are grouped together in the same network profile group based on the profile IDs 312 and 314 having the same value of "1." In an exemplary aspect, the SSIDs 332 and 334 correspond to different wireless networks supported by different APs. In this example, the APs can share a common core network, or can be supported by different core networks/backbones. This example can correspond to a deployment within, for example, a shopping center, where the SSIDs correspond to networks of different stores. Since these wireless networks are in the same general location, the network profiles 350 can be grouped together by a common profile ID. Using this grouping, the communication device 140 can be configured to establish a connection with either or both of the networks corresponding to SSIDs 332 and 334 based on the common profile ID value of the profile IDs 312 and 314. This can facilitate a smooth transition from one network to the other even though they have different SSIDs.

Using the interface 300, the communication device 140, AP 120, and/or core network 111 can be configured to perform one or more AP selection operations and/or one or more roaming trigger operations based on two or more grouped network profiles 350. In an exemplary aspect, the grouping of network profiles 350 can be based on, for example, whether: the wireless networks represented by the SSIDs share a common AP, the corresponding APs share a common backbone network serving the APs, the APs provide one or more common services, the APs are associated with a common entity (e.g., home, office, shopping center, airport, municipality, etc.) but have different network configurations (e.g., different SSIDs, security details, etc.), and/or one or more other characteristics as would be understood by one of ordinary skill in the art.

In an exemplary aspect, one or more APs 120 are configured to include a Domain ID that can be published as information in, for example, a Beacon/Association Response/Probe response. In operation, a communication device 140 communicating with the AP 120 will be provided the corresponding Domain ID of the AP 120. The communication device 140 can be configured to group two or more APs 120 based on their corresponding Domain IDs provided to the communication device 140. In this example, the communication device 140 can establish a database of network profiles 350 based on the APs 120 and their corresponding Domain IDs provided to the communication device 140. By using Domain IDs, the APs 120 can be configured without continued configuration operations by users of the communication devices 140 (e.g., that the user of the communication device 140 select the profile ID via, for example the selector 352).

In an exemplary aspect, the network profiles 350 can be grouped based on a service level (e.g., Enterprise network, connection to internet, etc.). Grouped network profiles 350 can then be selected based on the desired service level by selecting the corresponding profile ID. In an exemplary aspect, the AP's 120 service level and/or provided services can be published by, for example, AP Generic Advertisement Service (GAS) and can be obtained using the Access Network Query Protocol (ANQP). Using service and/or service level grouping can reduce the configurations at the end user level (e.g., user of communication device). This can be beneficial for systems having devices with limited configuration options, such as internet of things (IOT) devices.

Figure 4:
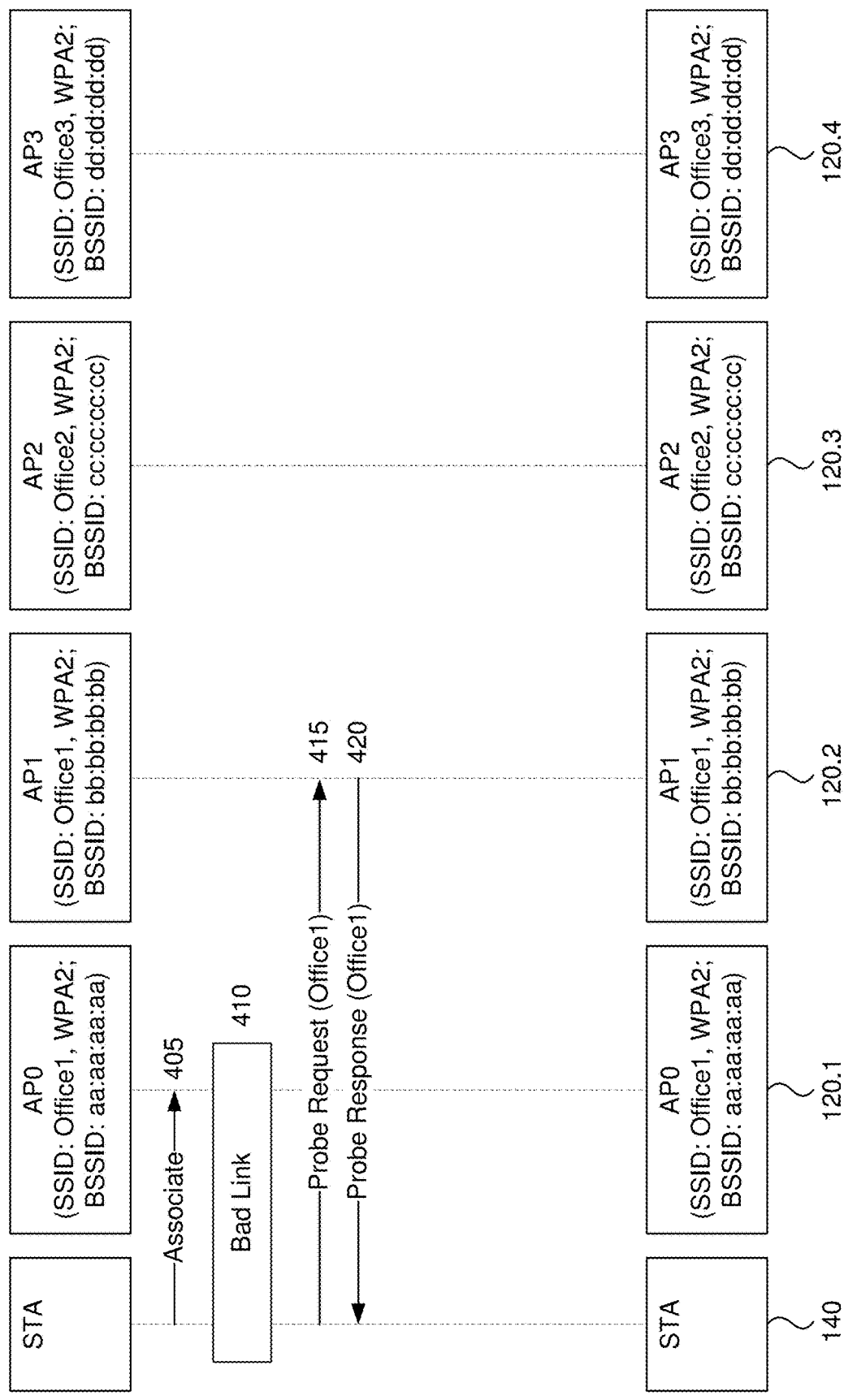
FIG. 4 illustrates a scanning operation according to an exemplary aspect of the present disclosure.

FIG. 4 illustrates a scanning operation 400 according to an exemplary aspect of the present disclosure.

In an exemplary aspect, when connected to an AP 120, the communication device 140 can trigger a scanning operation based on, for example, a manual scanning initiation by a user of the communication device 140 or automatically; and/or a determination of the current communication link (e.g., reduced RSSI, increased packet error rate, reduced latency, etc.).

In a scanning operation, the communication device 140 can be configured to query for connection candidates or alternative connections in the vicinity of the communication device 140. In an exemplary aspect, AP devices that match a current profile, a last connected profile, a manual selected profile, and a profile that matches a currently associated AP 120 (e.g., matching SSID and/or security characteristics of the current connected AP 120).

For example, as illustrated in FIG. 4, the currently connected AP 120.1 has a SSID value of "Office1" with WPA2 security. This connection is established at operation 405. At operation 410, the connection of the communication device 140 and the AP 120.1 deteriorates (e.g., reduced RSSI, increased packet error rate, reduced latency, etc.). In response to the deteriorated communication link, the communication device 140 can perform a scanning operation as illustrated in operations 415 and 420. In operation 415, a probe request is sent by the communication device 140 to AP 120.2. In response to the probe request, the AP 120.2 generates and transmits a probe response to the communication device 140. In this example, because APs 120.3 and 120.4 have difference SSID s and/or different security configurations, APs 120.3 and 120.4 are not included in the scanning operation.

Figure 5:
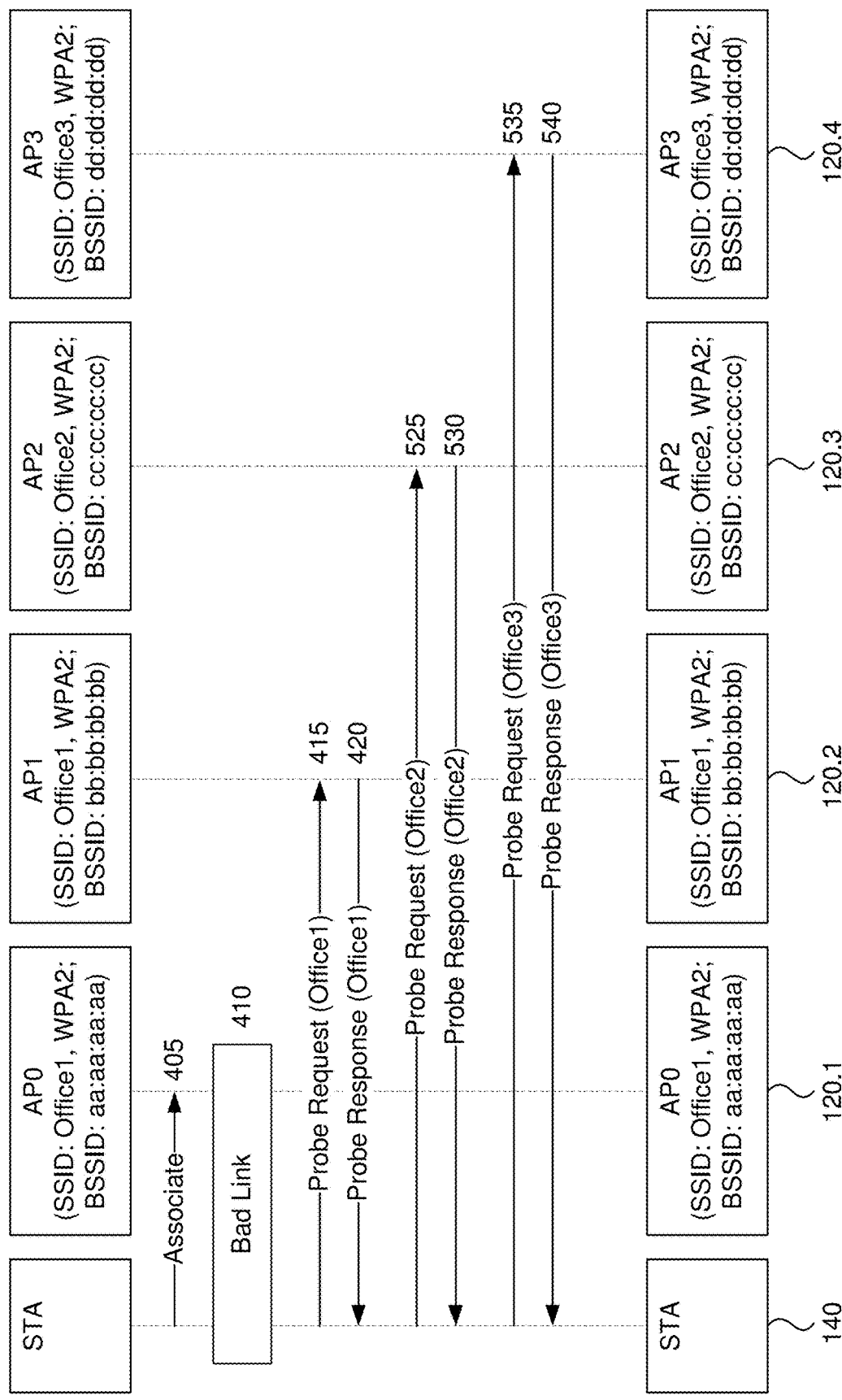
FIG. 5 illustrates a scanning operation according to an exemplary aspect of the present disclosure.

Turning to FIG. 5, a scanning operation 500 according to an exemplary aspect of the present disclosure is illustrated that is similar to the scanning operation 400, but represents a scanning operation in which APs have been grouped based on profile IDs. In this example, APs 120.1, 120.2, 120.3 and 120.4 have previously been grouped together by assigning these APs a same profile ID value (e.g., as illustrated in FIG. 3 for profile IDs 310 and 320).

In an exemplary aspect, the scanning operation 500 can be based on the profile IDs associated with the APs 120 in the vicinity of the communication device 140. In this example, similar to the scanning operation 400, the AP 120.1 has a SSID value of "Office1" with WPA2 security. This connection is established at operation 405. At operation 410, the connection of the communication device 140 and the AP 120.1 deteriorates (e.g., reduced RSSI, increased packet error rate, reduced latency, etc.). In response to the deteriorated communication link, the communication device 140 can perform a scanning operation (e.g., operations 415, 420). Because the APs 120.1, 120.2, 120.3, and 120.4 have previously been grouped together by assigning these APs a same profile ID value, the scanning operation that includes probe requests and probe responses can extend to APs 120.3 and 120.4 (operations 525, 530, 535, 540) even though APs 120.3 and 120.4 have different SSID values "Office2" and "Office3," respectively, and/or different security configurations. In this example, the number of APs 120 available to the communication device 140 have increased as a result of the grouping based on profile IDs.

Figure 6:
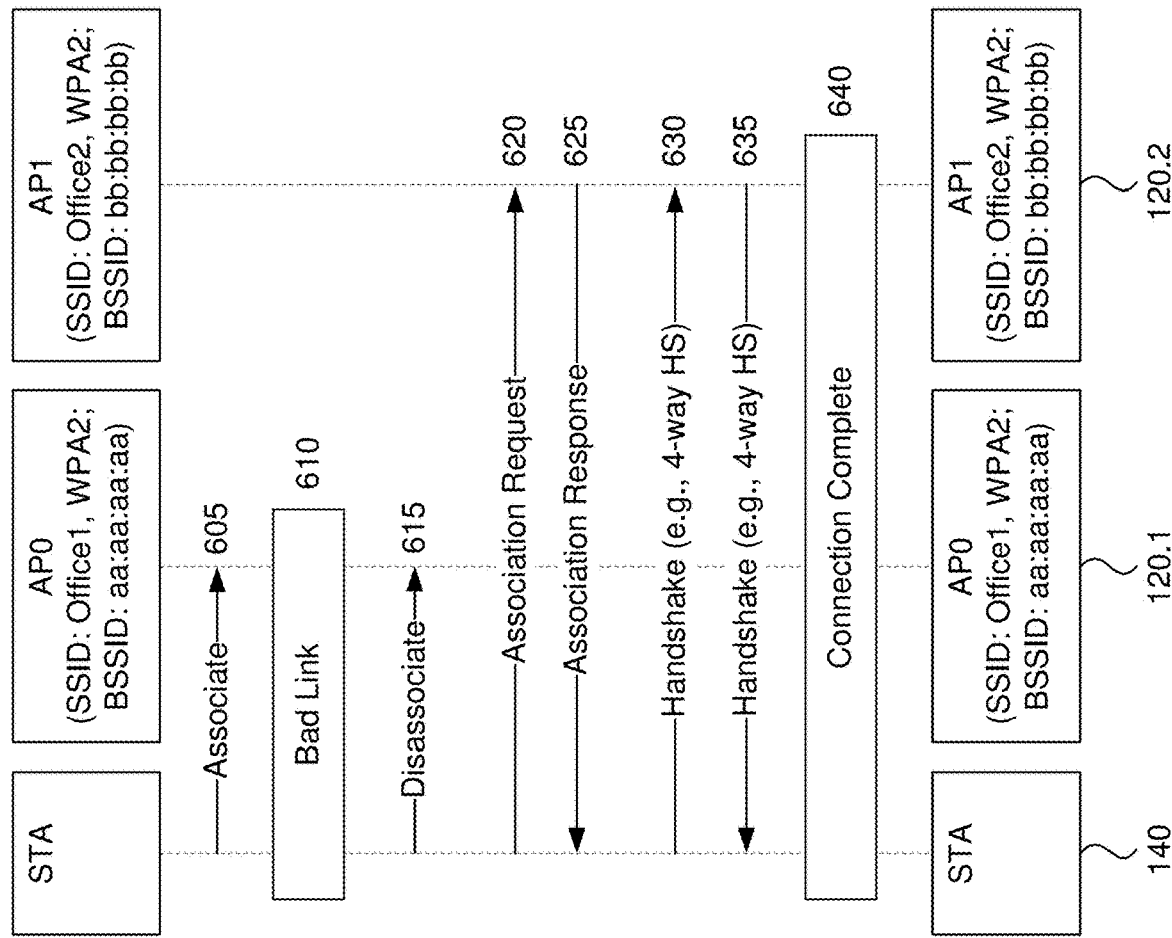
FIG. 6 illustrates an access point selection operation according to an exemplary aspect of the present disclosure.

FIG. 6 illustrates a selection operation 600 according to an exemplary aspect of the present disclosure.

After discovery of APs in the vicinity of the communication device 140 can be configured to determine an AP from the available APs to connect with. The determination can be based on one or more wireless characteristics of the APs, including, for example, the quality of service of the AP, the signal strength, latency, transmission power, SNR, SINR, and/or one or more other characteristics as would be understood by one of ordinary skill in the relevant arts. The communication device 140 can be configured to rank the APs based on the characteristics.

In an exemplary aspect, upon selection, initial connection or transition to an alternative will be initiated. For example, the communication device 140 associates with AP 120.1 (operation 605). In operation 605, the communication device 140 associates with AP 120.1 by transmitting an association communication to the AP 120.1. If the link between the communication device 140 and the AP 120.1 deteriorates (operation 610), the communication device 140 will dissociate with the AP 120.1 (operation 615). For example, the communication device 140 can transmit a disassociation communication to the AP 120.1. In this example, because the AP 120.1 and 120.2 have difference SSIDs and/or different security configurations, the communication device 140 dissociates with AP 120.1 and the connection is dropped before the communication device 140 associates with AP 120.2.

Once disassociated, service on the communication device 140 is disrupted and dropped. The communication device 140 can then select another AP to associate with so as to reestablish communication services. For example, the communication device 140 can transmit an association request 620 to the AP 120.2. The AP 120.2 can reply with an association response at operation 625. The communication device 140 and the AP 120.2 perform a handshake (e.g., 4-way handshake) at operations 630 and 635. After a successful handshake operation, the connection between the communication device 140 and the AP 120.2 is established (operation 640).

FIG. 7 illustrates a selection operation 700 according to an exemplary aspect of the present disclosure. The selection operation 700 is similar to the selection operation 700, but represents a selection operation in which APs have been grouped based on profile IDs. In this example, APs 120.1 and 120.2 have previously been grouped together by assigning these APs a same profile ID value (e.g., as illustrated in FIG. 3 for profile IDs 310 and 320). By grouping APs and/or networks based on profile IDs, even though APs 120.1 and 120.2 have difference SSIDs and/or security configurations, the communication device 140 can perform a "make before break" transition from AP 120.1 to AP 120.2.

Similar to selection operation 600, the communication device 140 associates with AP 120.1 (operation 705). In operation 705, the communication device 140 associates with AP 120.1 by transmitting an association communication to the AP 120.1. If the link between the communication device 140 and the AP 120.1 deteriorates (operation 710), the communication device 140 can transmit an association request 720 to the AP 120.2 to associate with the AP 120.2. Differently than selection operation 600, the association with the destination AP (e.g., AP 120.2) is performed before the communication device 140 disassociates with its currently serving AP (e.g., AP 120.1). That is, the communication device 140 performs a "make before break" transition from AP 120.1 to AP 120.2.

To associate with the AP 120.2, the communication device 140 can transmit an association request 720 to the AP 120.2. The AP 120.2 can reply with an association response at operation 725. The communication device 140 and the AP 120.2 perform a handshake (e.g., 4-way handshake) at operations 730 and 735. After a successful handshake operation, the connection between the communication device 140 and the AP 120.2 is established (operation 740). After the connection with AP 120.2 is established, the communication device 140 will dissociate with the AP 120.1 (operation 745). For example, the communication device 140 can transmit a disassociation communication to the AP 120.1. In this example, because the APs 120.1 and 120.2 have been grouped together based on a profile ID, the communication device 140 can maintain communication services by first associating with the AP 120.2 based on the profile ID before dissociating with the AP 120.1.

In an exemplary aspect, the communication device 140 can transition to another AP (e.g., 120.2) using one or more roaming operations or techniques, including, for example, Opportunistic Key Cashing (OKC), Fast BSS transition (FR), Fast Session Transfer (FST), and/or other operations or techniques as would be understood by one of ordinary skill in the art.

EXAMPLES

Example 1 is a method adapted for managing network profile grouping used in a communication device, comprising: determining wireless characteristics of a plurality of wireless access points (APs); matching together two or more APs of the plurality of APs based on the determined wireless characteristics; assigning a group profile identification (ID) to the matched two or more APs; and grouping together the matched two or more APs based on the assigned group profile ID.

In Example 2, the subject matter of Example 1, further comprising: establishing a communication link between the communication device and at least one of the matched two or more APs based on the group profile ID.

In Example 3, the subject matter of Example 1, further comprising: transitioning from a communication link between the communication device and a first AP of the two or more matched APs to a communication link between the communication device and a second AP of the two or more matched APs based on the group profile ID.

In Example 4, the subject matter of Example 1, wherein determining the wireless characteristics comprises determining: service set identifiers (SSIDs) of the plurality of APs; security configuration information of the plurality of APs; backhaul network information of the plurality of APs; and/or service provider information of the plurality of APs.

In Example 5, the subject matter of Example 1, wherein assigning the group profile ID to the matched two or more APs comprises: selecting a group profile ID from a plurality of group profile IDs and assigning the selected group of profile ID to the matched two or more APs.

In Example 6, the subject matter of Example 5, wherein selecting the group profile ID from the plurality of group profile IDs comprises: selecting the group profile ID via a graphical user interface.

In Example 7, the subject matter of Example 1, wherein assigning the group profile ID to the matched two or more APs comprises assigning a common domain identification to the matched two or more APs.

In Example 8, the subject matter of Example 1, wherein a service provider supporting the matched two or more APs is configured to control the assigning of the group profile ID to the matched two or more APs.

Example 9 is a communication device configured for network profile grouping operations, comprising: transceiver configured to transmit or receive communications to or from one or more of a plurality of access points (APs); and a controller configured to: determine wireless characteristics of the plurality of wireless APs; match together two or more APs of the plurality of APs based on the determined wireless characteristics; assign a group profile identification (ID) to the matched two or more APs; and group together the matched two or more APs based on the assigned group profile ID.

In Example 10, the subject matter of Example 9, wherein the controller is further configured to: establish a communication link, using the transceiver, between the communication device and an AP of the matched two or more APs based on the group profile ID.

In Example 11, the subject matter of Example 9, wherein the controller is further configured to transition, using the transceiver, from a communication link between the communication device and a first AP of the two or more matched APs to a communication link between the communication device and a second AP of the two or more matched APs based on the group profile ID.

In Example 12, the subject matter of Example 9, wherein, to determine the wireless characteristics, the controller is configured to determine: service set identifiers (SSIDs) of the plurality of APs; security configuration information of the plurality of APs; backhaul network information of the plurality of APs; and/or service provider information of the plurality of APs.

In Example 13, the subject matter of Example 9, wherein the controller is configured to select a group profile ID from a plurality of group profile IDs and assigning the selected group of profile ID to the matched two or more APs.

In Example 14, the subject matter of Example 13, wherein the controller is further configured to: generate a graphical user interface that comprises information corresponding to the plurality of wireless APs; and arrange the information corresponding to the plurality of wireless APs within the graphical user interface based on the wireless characteristics of the plurality of wireless APs.

In Example 15, the subject matter of Example 14, wherein the controller is further configured to assign the group profile ID based on a section of the group profile ID via the graphical user interface.

In Example 16, the subject matter of Example 9, wherein the communication device is a mobile wireless communication device.

Example 17 is an access point (AP) configured for network profile grouping operations, comprising: a transceiver configured to transmit or receive communications to or from one or more communication devices; and a controller configured to: establish a wireless communication network having one or more wireless characteristics; and assign a group profile identification (ID) to the wireless communication network based on an association with one or more other APs.

In Example 18, the subject matter of Example 17, wherein the controller is further configured to: establish a communication link on the wireless communication network between the one or more communication devices based on the group profile ID.

In Example 19, the subject matter of Example 17, wherein the wireless characteristics comprise: a service set identifier (SSID) of the AP; security configuration information of the AP; backhaul network information of one or more backhaul networks supporting the AP; and/or service provider information of the AP.

In Example 20, the subject matter of any of Examples 1-2, further comprising: transitioning from a communication link between the communication device and a first AP of the two or more matched APs to a communication link between the communication device and a second AP of the two or more matched APs based on the group profile ID.

In Example 21, the subject matter of any of Examples 1-4, 7, and 8 wherein assigning the group profile ID to the matched two or more APs comprises: selecting a group profile ID from a plurality of group profile IDs and assigning the selected group of profile ID to the matched two or more APs.

In Example 22, the subject matter of Example 21, wherein selecting the group profile ID from the plurality of group profile IDs comprises: selecting the group profile ID via a graphical user interface.

In Example 23, the subject matter of any of Examples 1-3, and 5-8, wherein determining the wireless characteristics comprises determining: service set identifiers (SSIDs) of the plurality of APs; security configuration information of the plurality of APs; backhaul network information of the plurality of APs; and/or service provider information of the plurality of APs.

Example 24 is a communication device configured for network profile grouping operations, comprising: determining means for determining wireless characteristics of a plurality of wireless access points (APs); matching means for matching two or more APs of the plurality of APs together based on the determined wireless characteristics; assigning means for assigning a group profile identification (ID) to the matched two or more APs; and grouping means for grouping the matched two or more APs together based on the assigned group profile ID.

In Example 25, the subject matter of Example 24, further comprising: linking means for establishing a communication link between the communication device and at least of the matched two or more APs based on the group profile ID.

In Example 26, the subject matter of any of Examples 24-25, wherein the communication device transitions from a communication link between the communication device and a first AP of the two or more matched APs to a communication link between the communication device and a second AP of the two or more matched APs based on the group profile ID.

In Example 27, the subject matter of any of Examples 24-26, wherein assigning the group profile ID to the matched two or more APs comprises: selecting a group profile ID from a plurality of group profile IDs and assigning the selected group of profile ID to the matched two or more APs.

In Example 28, the subject matter of Example 27, wherein selecting the group profile ID from the plurality of group profile IDs comprises: selecting the group profile ID via a graphical user interface.

In Example 29, the subject matter of Example 24, wherein assigning the group profile ID to the matched two or more APs comprises assigning a common domain identification to the matched two or more APs.

In Example 30, the subject matter of Example 24, wherein a service provider supporting the matched two or more APs is configured to control the assigning of the group profile ID to the matched two or more APs.

In Example 31, the subject matter of any of Examples 24-30, wherein determining the wireless characteristics comprises determining: service set identifiers (SSIDs) of the plurality of APs; security configuration information of the plurality of APs; backhaul network information of the plurality of APs; and/or service provider information of the plurality of APs.

Example 32 is an apparatus comprising means to perform the method as described in any of Examples 1-8.

Example 33 is a communication device comprising means to perform the method as described in any of Examples 1-8.

Example 34 is an access point comprising means to perform the method as described in any of Examples 1-8.

Example 35 is a communication device comprising processor circuitry configured to perform the method as described in any of Examples 1-8.

Example 36 is an access point comprising processor circuitry configured to perform the method as described in any of Examples 1-8.

Example 37 is a computer program product embodied on a computer-readable medium comprising program instructions, when executed, causes a processor to perform the method of any of Examples 1-8.

Example 38 is an apparatus substantially as shown and described.

Example 39 is a method substantially as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

As will be apparent to a person of ordinary skill in the art based on the teachings herein, exemplary aspects are not limited to IEEE 802.11 protocols, and can be applied to other cellular communication standards, including (but not limited to) Long-Term Evolution (LTE) and/or, LTE Advanced, one or more fifth generation (5G) communications, Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), Worldwide Interoperability for Microwave Access (WiMAX) (Institute of Electrical and Electronics Engineers (IEEE) 802.16), and/or one or more cellular communications using one or frequency bands of the industrial, scientific and medical (ISM) radio bands to provide some examples. Further, exemplary aspects are not limited to cellular communication networks and can be used or implemented in other kinds of wireless communication access networks, including (but not limited to) Bluetooth, Nearfield Communication (NFC) (ISO/IEC 18092), ZigBee (IEEE 802.15.4), Z-Wave, Radio-frequency identification (RFID), and/or one or more non-cellular communications using one or frequency bands of the ISM radio bands to provide some examples. Further, exemplary aspects are not limited to the above wireless networks and can be used or implemented in one or more wired networks using one or more well-known wired specifications and/or protocols.

What is claimed is:

1. A method adapted for managing network profile grouping used in a communication device, comprising:
   determining wireless characteristics of a plurality of wireless access points (APs), the wireless characteristics including backhaul network information of the plurality of APs and service capability information of the plurality of APs;
   matching together two or more APs of the plurality of APs based on the determined wireless characteristics, two or more APs being matched together: in a backhaul network association in response to the two or more APs sharing a common backhaul network identified in the respective backhaul network information that serves the two or more APs, in a service association in response to the two or more APs offering one or more common services identified in the respective service capability information, and in an entity association in response to the two or more APs being associated with a common entity identified by the wireless characteristics;
   assigning a group profile identification (ID) to the matched two or more APs; and
   grouping together the matched two or more APs based on the assigned group profile ID.

2. The method of claim 1, further comprising:
   establishing a communication link between the communication device and at least one of the matched two or more APs based on the group profile ID.

3. The method of claim 1, further comprising:
   transitioning from a communication link between the communication device and a first AP of the two or more matched APs to a communication link between the communication device and a second AP of the two or more matched APs based on the group profile ID.

4. The method of claim 1, wherein the wireless characteristics further comprise:
   service set identifiers (SSIDs) of the plurality of APs;
   security configuration information of the plurality of APs; and/or
   service provider information of the plurality of APs.

5. The method of claim 1, wherein assigning the group profile ID to the matched two or more APs comprises: selecting a group profile ID from a plurality of group profile IDs and assigning the selected group of profile ID to the matched two or more APs.

6. The method of claim 5, wherein selecting the group profile ID from the plurality of group profile IDs comprises: selecting the group profile ID via a graphical user interface.

7. The method of claim 1, wherein assigning the group profile ID to the matched two or more APs comprises assigning a common domain identification to the matched two or more APs.

8. The method of claim 1, wherein a service provider supporting the matched two or more APs is configured to control the assigning of the group profile ID to the matched two or more APs.

9. The method of claim 1, wherein the two or more APs are matched together based on the entity association having different network configurations from each other.

10. A communication device configured for network profile grouping operations, comprising:
    a transceiver configured to transmit or receive communications to or from one or more of a plurality of access points (APs); and
    a controller configured to:
       determine wireless characteristics of the plurality of wireless APs, the wireless characteristics including backhaul network information of the plurality of APs and service capability information of the plurality of APs;
       match together two or more APs of the plurality of APs based on the determined wireless characteristics, two or more APs being matched together: in a backhaul network association in response to the two or more APs sharing a common backhaul network identified in the respective backhaul network information that serves the two or more APs, in a service association in response to the two or more APs offering one or more common services identified in the respective service capability information, and in an entity association in response to the two or more APs being associated with a common entity identified by the wireless characteristics;
       assign a group profile identification (ID) to the matched two or more APs; and
       group together the matched two or more APs based on the assigned group profile ID.

11. The communication device of claim 10, wherein the controller is further configured to:
    establish a communication link, using the transceiver, between the communication device and an AP of the matched two or more APs based on the group profile ID.

12. The communication device of claim 10, wherein the controller is further configured to transition, using the transceiver, from a communication link between the communication device and a first AP of the two or more matched APs to a communication link between the communication device and a second AP of the two or more matched APs based on the group profile ID.

13. The communication device of claim 10, wherein the wireless characteristics further comprise:
    service set identifiers (SSIDs) of the plurality of APs;
    security configuration information of the plurality of APs; and/or
    service provider information of the plurality of APs.

14. The communication device of claim 10, wherein the controller is further configured to:
    select a group profile ID from a plurality of group profile IDs; and
    assign the selected group of profile ID to the matched two or more APs.

15. The communication device of claim 14, wherein the controller is further configured to:
    generate a graphical user interface that comprises information corresponding to the plurality of wireless APs; and
    arrange the information corresponding to the plurality of wireless APs within the graphical user interface based on the wireless characteristics of the plurality of wireless APs.

16. The communication device of claim 15, wherein the controller is further configured to assign the group profile ID based on a section of the group profile ID via the graphical user interface.

17. The communication device of claim 10, wherein the communication device is a mobile wireless communication device.

18. An access point (AP) configured for network profile grouping operations, comprising:
- a transceiver configured to transmit or receive communications to or from one or more other APs of a plurality of APs comprising the AP; and
- a controller configured to:
  - establish a wireless communication network having one or more wireless characteristics including backhaul network information of the plurality of APs and service capability information of the plurality of APs; and
  - assign a group profile identification (ID) to the wireless communication network based on an association with the one or more other APs, the association being determined based on the one or more wireless characteristics, wherein the AP is associated with the one or more other APs: in a backhaul network association in response to the AP sharing a common backhaul network that serves the AP and the one or more other APs and is identified in the respective backhaul network information with the one or more other APs, in a service association in response to the AP offering one or more common services identified in the respective service capability information with the one or more other APs, and in an entity association in response to AP and the one or more other APs being associated with a common entity identified by the wireless characteristics.

19. The AP of claim 18, wherein the controller is further configured to:
- establish a communication link on the wireless communication network between the one or more communication devices based on the group profile ID.

20. The AP of claim 18, wherein the wireless characteristics further comprise:
- a service set identifier (SSID) of the AP;
- security configuration information of the AP; and/or
- service provider information of the AP.

* * * * *